US009595156B2

(12) United States Patent
Kaiblinger et al.

(10) Patent No.: US 9,595,156 B2
(45) Date of Patent: Mar. 14, 2017

(54) PRIZE WHEEL WITH GESTURE-BASED CONTROL (71) Applicant: NOVOMATIC AG, Gumpoldskirchen (AT)

(72) Inventors: Harald Kaiblinger, Gumpoldskirchen (AT); Florian Schroetter, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 320 days.

(21) Appl. No.: 14/373,675

(22) PCT Filed: Jan. 17, 2013

(86) PCT No.: PCT/EP2013/050871
§ 371 (c)(1),
(2) Date: Jul. 22, 2014

(87) PCT Pub. No.: WO2013/110544
PCT Pub. Date: Aug. 1, 2013

(65) Prior Publication Data
US 2015/0011285 A1 Jan. 8, 2015

(30) Foreign Application Priority Data

Jan. 23, 2012 (EP) .................................... 12450004

(51) Int. Cl.
*G06F 17/00* (2006.01)
*G07F 17/32* (2006.01)
(Continued)

(52) U.S. Cl.
CPC .......... *G07F 17/3209* (2013.01); *A63F 5/045* (2013.01); *G07C 15/00* (2013.01);
(Continued)

(58) Field of Classification Search
None
See application file for complete search history.

(56) References Cited

U.S. PATENT DOCUMENTS 8,659,548 B2   2/2014  Hildreth
8,721,416 B2   5/2014  Grant et al.
(Continued)

FOREIGN PATENT DOCUMENTS

CN    101316636    12/2008
CN    101517514    8/2009
(Continued)

OTHER PUBLICATIONS

International Search Report for PCT/EP2013/050871, English translation attached to original, Both completed by the European Patent Office on Mar. 27, 2013, 7 Pages.
(Continued)

*Primary Examiner* — Paul A D'Agostino
(74) *Attorney, Agent, or Firm* — Brooks Kushman P.C.

(57) ABSTRACT

A method and an arrangement for the operation of a prize wheel by a user. The position of the center of gravity and the position of a hand of the user are ascertained using a camera; a height threshold is fixed in relation to the center of gravity; if the position of the hand exceeds the height threshold, a rotation phase is started, the rotation which is carried out by the movement of the hand of the user is continuously ascertained, and a rotational angle is ascertained; the angular speed, i.e. the rate of change over time of the ascertained angle, is determined; the rotation phase is ended, and an angular speed, is fixed as the initial rotational speed; and a free rotation phase is started. The prize wheel is further rotated, and the prize wheel is continuously braked and comes to rest upon a specified end position.

16 Claims, 5 Drawing Sheets (51) Int. Cl.
*A63F 5/04* (2006.01)
*G07C 15/00* (2006.01)
*G06F 3/01* (2006.01)
*A63F 9/24* (2006.01)

(52) U.S. Cl.
CPC .... G07C 15/006 (2013.01); *A63F 2009/2435* (2013.01); *G06F 3/017* (2013.01)

(56) References Cited

U.S. PATENT DOCUMENTS

| | | | | |
|---|---|---|---|---|
| 2004/0166937 | A1* | 8/2004 | Rothschild | G07F 17/3209 463/36 |
| 2009/0027337 | A1* | 1/2009 | Hildreth | G06F 3/011 345/158 |
| 2009/0124379 | A1* | 5/2009 | Wells | G07F 17/3211 463/31 |
| 2009/0143141 | A1* | 6/2009 | Wells | G07F 17/32 463/37 |
| 2009/0315740 | A1* | 12/2009 | Hildreth | G06F 3/017 341/20 |
| 2011/0289456 | A1* | 11/2011 | Reville | G06F 3/017 715/830 |

FOREIGN PATENT DOCUMENTS

| | | |
|---|---|---|
| CN | 101810003 | 8/2010 |
| DE | 29516806 | 1/1996 |
| WO | 2007043036 | 4/2007 |
| WO | 2007105205 | 9/2007 |
| WO | 2008120217 | 10/2008 |
| WO | 2011013079 | 2/2011 |

OTHER PUBLICATIONS

Website http://marketplace.xbox.com/de-DE/Product/CARNIAL-In-Aktion/66acd00077fe-1000-9115-d80254540890. XP 007920645, Dated Apr. 8, 2011, Bibliographic Data and English translation attached to orignal document, All together 4 Pages, "A Day at the Fairground."

* cited by examiner

Fig. 15

PRIZE WHEEL WITH GESTURE-BASED CONTROL

CROSS-REFERENCE TO RELATED APPLICATION

This application is the U.S. national phase of PCT Application No. PCT/EP2013/050871 filed on Jan. 17, 2013, which claims priority to European Patent Application No. 12450004.2 filed on Jan. 23, 2012, the disclosures of which are incorporated in their entirety by reference herein.

The invention relates to a method for operating a wheel of fortune in accordance with the preamble of patent claim 1 and to a wheel of fortune in accordance with the preamble of patent claim 10.

In the following text, establishing, determining, etc. continuously is understood to mean establishing, determining, etc. a variable at predetermined, regular or irregular time intervals. If a variable, for example the position of the hand, the turning angle, the turning velocity, etc., is established continuously, this variable is established either at regular time intervals, for example ten (10) times per second, or at predetermined irregular time intervals. Thus, continuously determining a variable can also be understood to mean adaptively adapting the establishment or determination of the variable. Continuously establishing can also be understood to mean that the respective time interval between two measurements is appropriately reduced in the case of great changes in time, which exceed a threshold value, of the variable to be determined.

A wheel of fortune is understood to mean a device which is put into motion by a user by introducing a turning movement and which subsequently rotates freely about a shaft with a certain amount of friction. The wheel of fortune is decelerated by this friction and, optionally, additional braking means. Various symbols are provided on the circumference of the wheel of fortune and these have a certain meaning for the further game, for example winning a certain sum of money, carrying out a further bonus game, the loss of the game, certain advantages in the following game, etc. As a result of the user turning the wheel of fortune, the turning position of the wheel is modified, with the user being unable to determine the specific end position of the wheel of fortune exactly; therefore, this results in a certain randomness of the result. Depending on the position at which the wheel of fortune stops, different symbols are established with the aid of an indicator and these influence the further game, as mentioned above. A wheel of fortune can be operated by virtue of an actual (mechanical) wheel being mounted rotatably about a shaft and the wheel being respectively imprinted with specific symbols.

However, a wheel of fortune can also be operated virtually, i.e. the wheel and the movement thereof and the imprint are depicted on a monitor actuated by a computer. In the case of virtual wheels of fortune, the rotation by the user, in particular, causes problems since the scope of influence of the user on the processes within the computer, in particular on the turning simulation, is restricted to certain input devices. To the extent that reference is made to a wheel of fortune in conjunction with this application, this is understood to mean both a virtual and a mechanical wheel of fortune.

The prior art has disclosed various actuation mechanisms, which are based on gestures and take place without contact. Thus, for example, US2004166937A1 discloses a games device with identification of gestures by a user, wherein the sensor for acquiring the user interaction may be e.g. a video camera, which acquires the movements of the hand of the user and compares these to a multiplicity of movements stored in a database. Depending on a comparison and a correspondence of the recorded gesture with the gestures stored in the database, an action assigned to the respective gesture is performed.

A substantial disadvantage of this method lies in the very complex, complicated image data analysis. Such a method is always restricted to a specific individual device and a specific user, and is not suitable for use for a multiplicity of different users.

It is an object of the invention to develop an intuitive device, namely a wheel of fortune, which can be actuated by most people and a method for operating this wheel of fortune.

In particular, it is intended that the identification of a multiplicity of different gestures is avoided and a detection method which is uniform for all users is developed.

By way of example, turning of a turning wheel (of fortune) finds industrial applicability as an additional game in or during a main game in a gambling machine. The additional game, which comprises turning of the turning wheel (of fortune), can be triggered by a predetermined event (e.g. an occurrence of scatter symbols) in the main game.

According to the invention, provision is made for a method for operating a wheel of fortune by a user, in which a camera is used to establish the position of the center of mass of the body and of a hand of the user, in which a height threshold is set to a predetermined value in relation to the center of mass of the body and in which, when the position of the hand exceeds the height threshold, a turning phase is started, during which the position of the hand is established continuously, in which the turning performed by the movement of the hand of the user is established continuously and a turning angle is established, in which the angular velocity, which is the rate of change of the established angle over time, is determined continuously, in which the turning phase is completed and an angular velocity determined continuously, preferably directly before the end of the turning phase, is determined as initial turning velocity and in which a free rotational phase is started after the end of the turning phase, wherein the further turning of the wheel of fortune is performed with the initial turning velocity as initial velocity and the wheel of fortune is continuously decelerated and comes to rest at a certain end position and this end position is kept available.

It is advantageous here that a number of users per system, which users, in particular, stand at a plurality of games devices arranged next to one another, are able to turn the wheel of fortune and are thus able to influence the further progress of the game. Gesture-based interactions with the games device are enabled for each user situated in the recording region of the camera.

A further advantage of the invention consists of enabling an interaction for a user which appears natural, wherein a wheel of fortune can be handled without physical contact of the wheel of fortune.

In order to identify the end of the turning phase, provision can be made for a further height threshold to be set to a predetermined value, in particular to a predetermined value below the center of mass of the body, and for the turning phase to be completed and the free rotational phase to be started when the position of the hand drops below the further height threshold.

Alternatively or additionally, in order to identify the end of the turning phase, provision can be made for the turning phase to be completed and the free rotational phase to be started when the angle covered by the wheel of fortune with respect to the initial position during the turning phase exceeds a predetermined threshold value and/or when the angular velocity exceeds a predetermined threshold value. Alternatively or additionally, in order to identify the end of the turning phase, provision can be made for the turning phase to be completed when a predetermined time threshold, for example measured from the time of exceeding the upper height threshold, is reached or exceeded.

An advantageous determination of the turning angle can be achieved by virtue of the turning angle being established periodically in time as an angle between a straight line, extending through the center of mass of the body and the position of the hand, and a predetermined, in particular perpendicular, reference straight line.

An alternative determination of the turning angle can be achieved by virtue of, at the start of the turning phase, the turning angle being set to a start angle $\alpha start=\alpha\_0$ and, during the turning phase, the position (hp_n) of the hand of the user being established continuously at predetermined times tn $$hp\_n=[hp\_n\_X, hp\_n\_Y, hp\_n\_Z],$$

and the following calculations being performed at each time during the turning phase:

$$\beta n=a\tan 2(hp\_n\_Y-hp\_n+1\_Y, hp\_n+1\_X-hp\_n\_X)$$

$$dn=\sqrt{((hp\_n+1\_X-hp\_n\_X)^2+(hp\_n+1\_Y-hp\_n\_Y)^2)}$$

$$\Delta\beta n=\beta n-\alpha\_n$$

$$fexp\_n=f(\Delta\beta n)$$

$$\Delta\alpha n=d0*fexp\_n*fsensitivity$$

$$\alpha n=\alpha n-1+\Delta\alpha n$$

where $\alpha n$ is the turning angle of the wheel of fortune at the time tn and where, preferably, f is the sine function and where fsensitivity has a value between 0 and 1, in particular between 0.1 and 0.4.

This renders it possible to establish the turning angle, with continuous establishment of the center of mass of the body of the user not being required.

In order to distinguish between right-handed and left-handed turns of the wheel of fortune, provision can be made for the position of the hand at the time of exceeding the height threshold to be compared to the position of the center of mass of the user in relation to a coordinate direction extending horizontally and normally to the plane of the wheel of fortune and for a rotation of the wheel of fortune in the clockwise direction or in the counterclockwise direction to be assumed depending on this comparison.

In order to achieve graphical traceability of the turning of the wheel of fortune, provision can be made for the wheel of fortune to be depicted at its respective turning angle on a monitor during the turning phase and/or during the free rotational phase and for this representation to be updated at predetermined intervals such that a turning movement of the wheel of fortune is perceived on the monitor.

A particularly advantageous establishment of the position of the user can be achieved by virtue of the position of the center of mass of the body and of the hand of the user being established by means of a 3D camera or an infrared-based depth-sensor camera, wherein distance information to the camera is respectively established for a number of pixels of the respective camera.

In order to avoid recording artifacts which are caused by the movements of different users, of those users situated in the recording region of the camera, provision can be made for only the user closest to the camera to be used for establishing the turning movement of the wheel of fortune.

Furthermore, the invention relates to an arrangement comprising a display unit with a monitor for depicting a wheel of fortune, and an acquisition unit with a camera for recording a user turning the wheel of fortune, wherein the display unit depicts the wheel of fortune at predetermined times with a predetermined turn angle, wherein the acquisition unit upon activation establishes the position of the hand and of the center of mass of the body of a user situated in the recording region of the camera, characterized by a control unit connected to the acquisition unit and to the display unit, wherein the control unit can be put into an initial state upon activation, in which the control unit actuates the acquisition unit for establishing the positions of the center of mass of the body and for continuously establishing the position of the hand of the user, wherein the control unit undertakes a comparison unit for comparing the established position of the hand with a predetermined height threshold and ends the initial state and starts a turning phase when the position of the hand exceeds the height threshold, wherein the control unit continuously establishes the position of the hand during the turning phase and continuously establishes the turning angle performed by the movement of the hand of the user, wherein it furthermore continuously determines the angular velocity, which is the rate of change of the established angle over time, wherein the control unit ends the turning phase and establishes the angular velocity established directly before the end of the turning phase as initial turning velocity and wherein the control unit, after the end of the turning phase, starts a free rotational phase, during which the further turning of the wheel of fortune is undertaken with the initial turning velocity established thus and the wheel of fortune is continuously decelerated and comes to rest at a certain end position and the control unit keeps this end position available.

This arrangement renders very simple determination of the turning movement of the user possible and can be used for a multiplicity of different users. There is an intuitive device which can be actuated by most people, namely a wheel of fortune which can be turned without physical contact.

In order to end the turning phase, provision can be made for a further height threshold to be set to a predetermined value, in particular to a predetermined value below the center of mass of the body, and for the control unit to end the turning phase and start the free rotational phase when the hand drops below the further height threshold.

Alternatively or additionally, in order to end the turning phase, provision can be made for the control unit to end the turning phase and start the free rotational phase when the turning angle covered by the wheel of fortune with respect to the initial position during the turning phase exceeds a predetermined threshold value and/or when the angular velocity exceeds a predetermined threshold value.

An advantageous determination of the turning angle can be achieved by virtue of the control unit comprising a turning angle determination unit, which establishes the turning angle periodically in time as an angle between a straight line, extending through the center of mass of the body and the position of the hand, and a predetermined, in particular perpendicular, reference straight line.

An alternative determination of the turning angle can be obtained by virtue of the control unit comprising a turning angle determination unit, which sets the turning angle to a predetermined start angle $\alpha\text{start}=\alpha\_0$ at the start of the turning phase, establishes, during the turning phase, the position ($hp\_n$) of the hand of the user continuously at predetermined times tn $hp\_n=[hp\_n\_X, hp\_n\_Y, hp\_n\_Z]$, and performs the following calculations at each time tn during the turning phase:

$\beta n=a\tan 2(hp\_n\_Y-hp\_n+1\_Y, hp\_n+1\_X-hp\_n\_X)$ $dn=\sqrt{((hp\_n+1\_X-hp\_n\_X)^2+(hp\_n+1\_Y-hp\_n\_Y)^2)}$ $\Delta\beta n=\beta n-\alpha\_n$ $f\exp\_n=f(\Delta\beta n)$ $\Delta\alpha n=d0*f\exp\_n*f\text{sensitivity}$ $\alpha n=\alpha n-1+\Delta\alpha n$ where $\alpha n$ is the turning angle of the wheel of fortune at the time and where, preferably, f is the sine function and where fsensitivity has a value between 0 and 1, in particular between 0.1 and 0.4.

This renders it possible to establish the turning angle, with continuous establishment of the center of mass of the body of the user not being required.

In order to distinguish between right-handed and left-handed turns of the wheel of fortune, provision can be made for a further comparison unit, which compares the position of the hand at the time of exceeding the height threshold to the position of the center of mass of the user in relation to a coordinate direction extending normally to the plane of the wheel of fortune and horizontally, and establishes whether a rotation of the wheel of fortune in the clockwise direction or in the counterclockwise direction takes place depending on this comparison.

In order to achieve graphical traceability of the turning of the wheel of fortune, provision can be made for the display unit to be depict the wheel of fortune at its respective turning angle on the monitor during the turning phase and/or during the free rotational phase and to update this representation at predetermined intervals such that a turning movement of the wheel of fortune can be perceived on the monitor.

A particularly advantageous establishment of the position of the user can be achieved by virtue of the camera being a 3D camera or an infrared-based depth-sensor camera, with the aid of which distance information to the camera can respectively be established for a number of pixels.

In order to avoid recording artifacts which are caused by the movements of different users, provision can be made for a selection unit, which, of those users situated in the recording region of the camera, selects only the user closest to the camera for establishing the turning movement of the wheel of fortune.

Two preferred exemplary embodiments of the invention and some variants of these exemplary embodiments are depicted in more detail in the following figures of the drawing.

Figure 1:
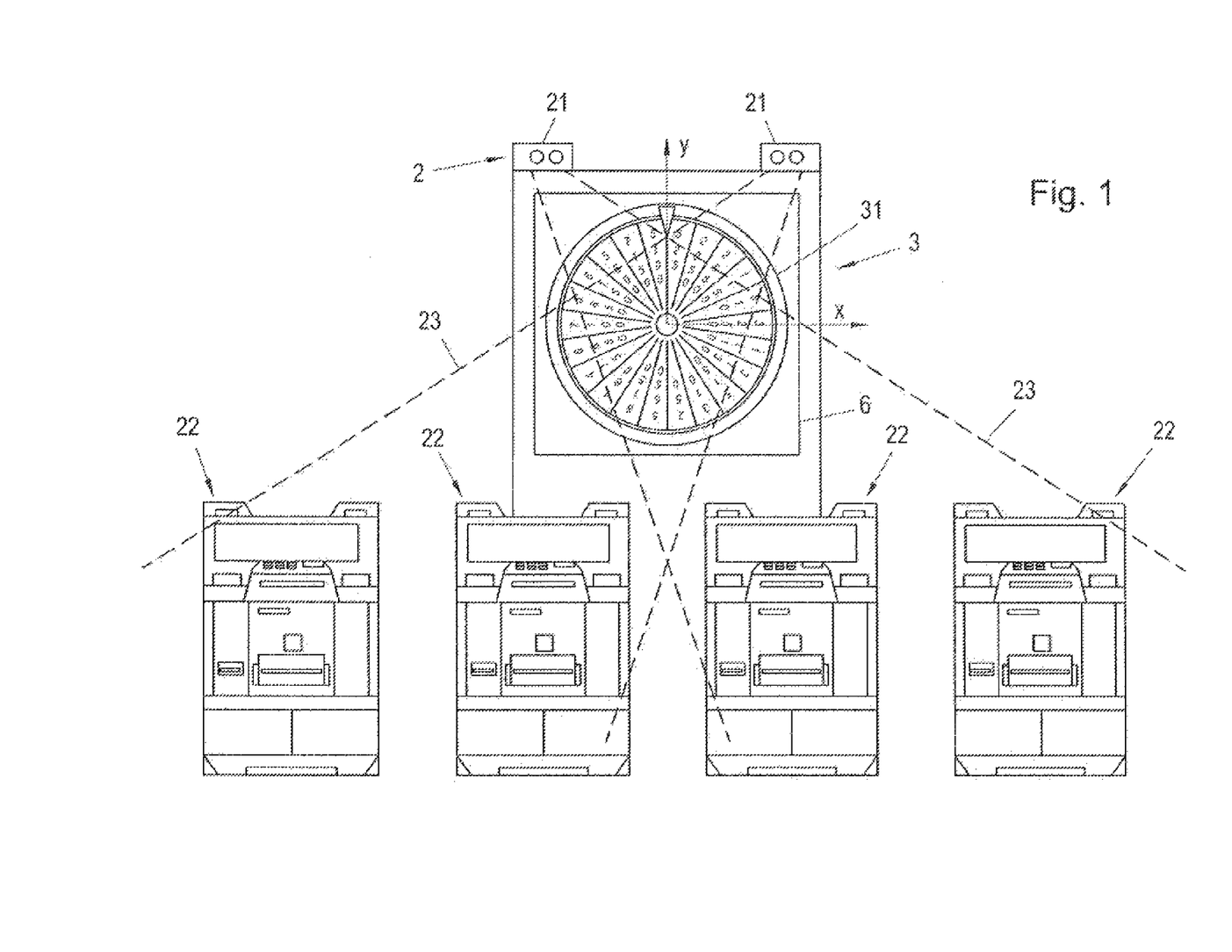
FIG. 1 shows an arrangement with a wheel of fortune and four machines.

FIG. 1 schematically depicts an arrangement comprising a display unit 6 with a virtual wheel of fortune 3. The arrangement comprises an infrared-based camera 2, in particular a depth-sensor camera, with two sensors 21, which camera is assigned to the wheel of fortune 3.

By way of example, such a depth-sensor camera is described in detail in the documents WO 2011/013079. An imaging system of the camera 2 projects a pattern or image onto the body, or onto at least part of the body, of the user 1, which pattern or image appears on the surface of the body. The imaging system usually uses infrared light for irradiation purposes. A computer in the imaging system of the camera 2 processes the images recorded by the two sensors 21, as a result of which depth information is obtained. An array of three-dimensional coordinates is available in each case as depth information, wherein a value in the form of a Z-coordinate or in the form of a spatial coordinate is in each case assigned to each pixel of an image recorded by a sensor. The computer of the imaging system of the camera 2 generates a three-dimensional point model of the body of the user 1, wherein the procedure described in method steps described in the publications WO 2007/043036, WO 2007/105205 and WO 2008/120217 is followed for triangulating the individual points. The camera 2 in each case supplies depth information for each one of the pixels, in particular in the form of the distance of the user from the camera 2, measured along the line of sight of the respective pixel.

The arrangement furthermore comprises four gambling machines 22, on which users 1 can play games. The games played on the gambling machines 22 can have a different content. If the game reaches a specified state, for example a win in the game, an in-game game is started, in which the user 1 playing on this gambling machine 22 has to turn the wheel of fortune 3. After turning the wheel of fortune 3 and depending on the resulting final position of the wheel of fortune 3, the game may be continued, a payout may occur or the game may be ended. The game can be made particularly exciting if a user 1, who won a game running on the gambling machine 22, can influence the payout amount on the wheel of fortune 3 by turning.

In place of a virtual (digital) wheel of fortune, a mechanical wheel of fortune can alternatively also be actuated, wherein a corresponding mechanical lightweight construction with a low wheel mass is advantageous in order to be able to follow even quick hand movements in a timely fashion. Here, the mechanical wheel can be actuated by a suitable motor, for example a stepper motor.

The wheel of fortune 3 comprises the above-described camera 2 with two sensors 21, which camera creates a three-dimensional image of the scene situated in the recording region 23 thereof. If the wheel of fortune 3 is activated, images of the scene situated in the recording region 23 are created continuously; in the present special exemplary embodiment, ten scenes are created per second, i.e. ten recording times, for which an image of the scene is created, are predetermined in each second. In the process, both the center of mass 11 of the respective users 1 and the position of the hand 12 of the respective user 1 are detected. The center of mass and the position of the hand of the user 1 are therefore available in the form of three-dimensional coordinates at each recording time.

Figure 2:
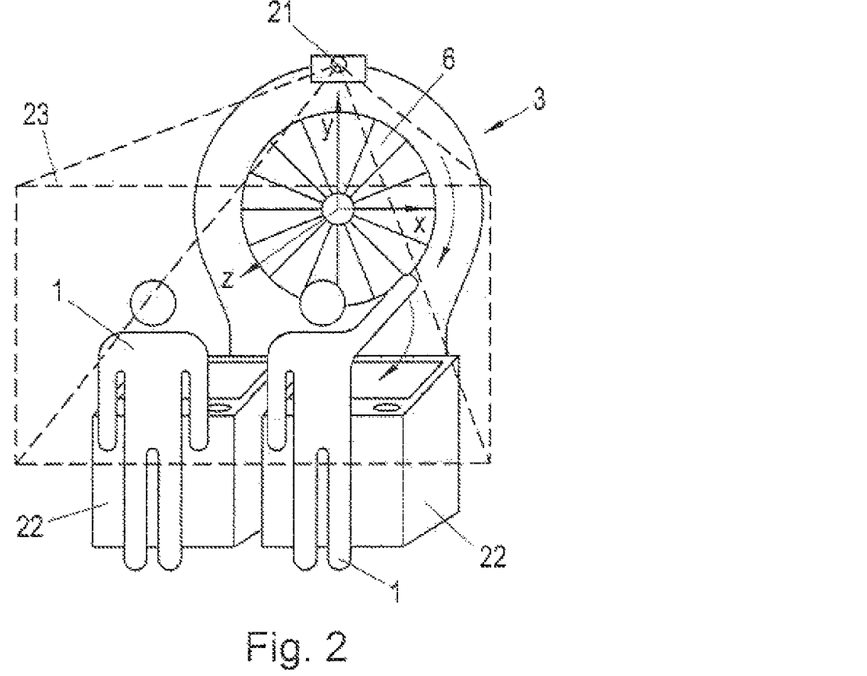
FIG. 2 shows a further arrangement in an oblique view with a wheel of fortune and two machines.
Figure 3:
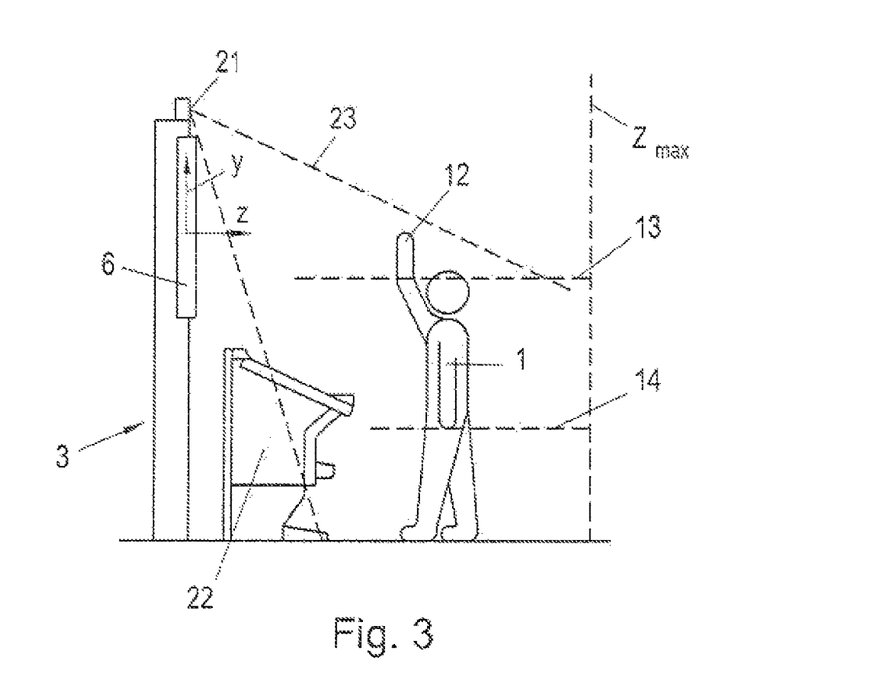
FIG. 3 shows the arrangement depicted in FIG. 2 in a side view.
Figure 4:
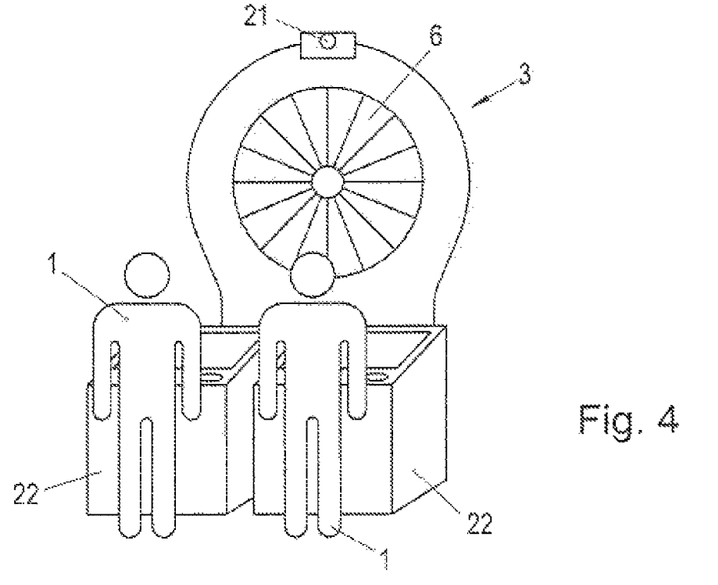
FIG. 4 shows the arrangement depicted in FIG. 2 in an oblique view.

In the present exemplary embodiment, the orientation of the coordinates is selected in such a way that the coordinate origin is selected to be in the turning point of the wheel of fortune 3 (FIGS. 2, 3). The Z-axis is arranged normally with respect to the plane of the wheel of fortune 3, the X-axis extends horizontally to the floor and the Y-axis extends vertically to the floor. In principle, any other orientation of the camera 2 can be prescribed if all coordinates are transformed into the above-described coordinate system by means of a coordinate transform.

Furthermore, in respect of the coordinate system, an upper height threshold 13 and a lower height threshold 14 are predetermined. In the present exemplary embodiment, the upper height threshold 13 is predetermined in absolute terms and situated approximately two meters above the floor. Alternatively, the upper height threshold can also be sent in relation to the Y-coordinate of the center of mass 11 of the user 1 and can be set approximately 60 to 80 cm above the Y-coordinate of the center of mass 11 of the respective user 1. Analogously to the upper height threshold 13, the lower height threshold 14 can be set either by specifying an absolute value, related to the floor, of approximately 1 m above the floor or by specifying a value related to the Y-coordinate of the center of mass 11 of the respective user 1. Thus, for example, a value of between 40 and 60 cm below the center of mass of the user 1 can be set as lower height threshold 14.

Figure 6:
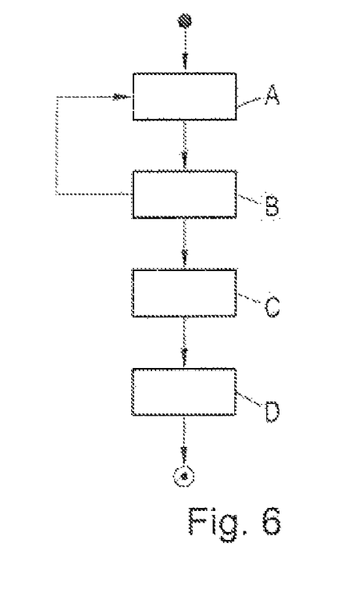
FIG. 6 shows a state diagram with all states of the method according to the invention.

In this embodiment of the invention, turning of the wheel of fortune 3 constitutes an in-game game in a machine game. As soon as the machine game on one of the machines 22 reaches a game state requiring the in-game game, the in-game game is activated; the in-game game is set into an initial state A (FIG. 6). The initial state serves for the user 1 to ready himself for turning the wheel of fortune and to bring his hand 12 into a position in which he can turn the wheel of fortune 3. Since the wheel of fortune 3 in this special embodiment of the invention is turned from top to bottom, the user 1 should lift his hand above the previously set upper height threshold 13 before turning the wheel of fortune 3.

Figure 7:
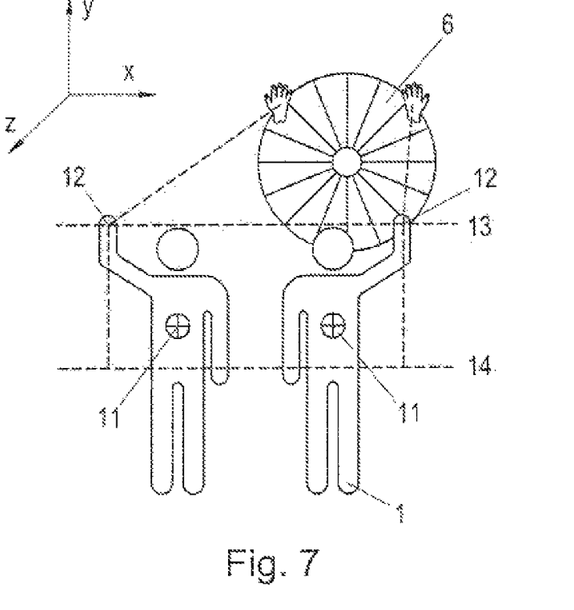
FIG. 7 shows the upper and lower height threshold and a schematic illustration of two persons at the start of the turning process with a lifted right and left hand, respectively.

In order to detect the lifting of the hand 12, the position of the hand is continuously monitored and re-determined, and the Y-coordinate of the position of the hand is compared to the upper height threshold 13 (FIG. 7). As soon as the Y-coordinate of the position of the hand exceeds the upper height threshold 13, the hand lifting gesture is considered to have been completed. The game advances from the initial state A to a turning phase B.

During the turning phase B, the user 1 moves his hand 12 from top to bottom, with the turning velocity ω of his hand 12 being determined. The user 1 subsequently performs a semicircular movement downward with his hand 12 and his arm.

During the turning phase B, the position of the wheel of fortune 3 is coupled directly to the position of the hand 12. Here, a sense should be conveyed to the user 1 that he can directly touch the wheel of fortune 3. Movements of the hand 12 of the user 1 should directly cause movements of the wheel of fortune 3. To this end, the position of the center of mass 11 of the user 1 and the position of the hand 12 of the user 1 continue to be established continuously. The position of the hand 12 of the user 1 is specified by the coordinates hand_X, hand_Y and hand_Z in relation to the above-defined coordinate system and the position of the center of mass is analogously specified by com_X, com_Y and com_Z. A turning angle α, which is subsequently used for turning the wheel of fortune 3, is calculated by means of the following equation:

$$\alpha = a\tan 2(\text{hand}_{13}\ Y - \text{com}\_Y, \text{com}\_X - \text{hand}\_X)$$

Figure 8:
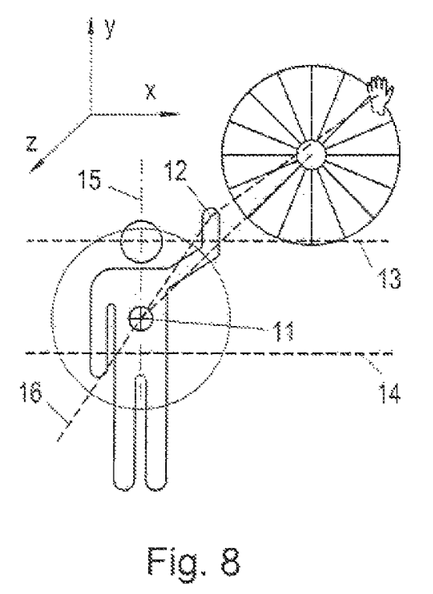
FIGS. 8 and 9 schematically show the turning angle being determined in accordance with a first preferred embodiment of the invention.
Figure 9:
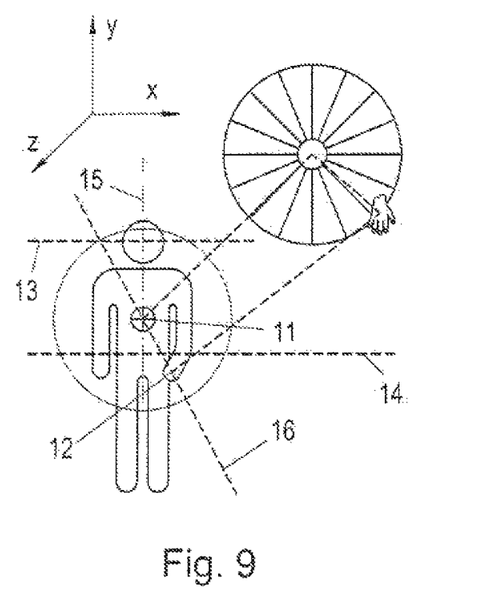
Figure 10:
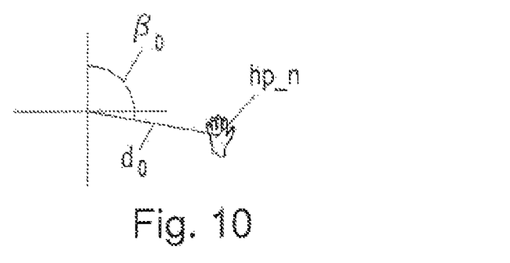
FIGS. 10 to 13 schematically show the turning angle being determined in accordance with a second preferred embodiment of the invention.

The turning angle α constitutes the angle between a straight line 15, extending through the center of mass of the body 11 and the position of the hand 12, and a predetermined, perpendicular reference straight line 16 extending through the center of mass of the body (FIGS. 8, 9).

If the turning angle α between two recording times changes by a predetermined value Δα, the turning angle α of the wheel of fortune 3 also changes by the same value Δα. Therefore, the user 1 can directly influence the turning angle α of the wheel of fortune with the movement of his hand 12. Therefore, a non-delayed correlation of further changes in position of the hand 12 with the turning movement of the wheel of fortune 3 is essentially established such that the user 1 is conveyed the sense of the wheel of fortune 3 being connected directly to his hand 12.

The change Δα in the turning angle α can be established as a difference between the turning angle α at a predetermined recording time $t_n$ and the turning angle $\alpha_{n-1}$ at the immediately preceding recording time $t_{n-1}$. Therefore, the following emerges:

$$\Delta\alpha = \alpha_n - \alpha_{n-1}.$$

If the difference Δα between the two recording times is known, the turning velocity ω can be calculated as follows:

$$\omega = \Delta\alpha/\Delta t = \Delta\alpha/(t_n - t_{n-1}) = \Delta\alpha * \text{fps},$$

where fps corresponds to the number of equidistant recording times per unit time. This velocity ω is determined continuously until the position 12 of the hand drops below the lower height threshold 14.

The position of his hand 12 and the turning velocity ω are established continuously within the scope of the turning by the user 1. If the position of the hand 12 drops below the lower height threshold 14, establishing of the turning velocity ω is completed and the last established velocity $\omega_e$ is used as initial velocity for the free rotational phase C of the wheel of fortune. (FIG. 6) The turning phase B is completed; a free rotational phase C starts.

The movement of a real wheel of fortune 3, in which the user 1 no longer has the option of intervening in the rotation of the wheel of fortune 3, is simulated during the free rotational phase C. The wheel of fortune 3 is, so to speak, left to itself and independently comes to a standstill due to its assumed friction.

In order to simulate the turning of the wheel of fortune 3 during the free rotational phase C, the wheel of fortune 3 is increased by certain at periodic time intervals, i.e. the turning angle α of the wheel of fortune 3 is increased per unit time by a predetermined value which depends on the turning velocity ω, wherein the turning velocity ω is continuously reduced (i.e. "braked") until the wheel of fortune 3 ultimately comes to rest. The free rotational phase C is completed with the wheel of fortune 3 coming to rest. Finally, the result of the turning can be established on the basis of the turning angle α at the time when the wheel of fortune 3 comes to rest.

As a result of this result, it is possible, for example, for differently high winnings, corresponding to the results of the turning, to be paid out; however, it is also possible for different initial states to be set in a following game, i.e. the following game can be won by the user 1 more easily or less easily.

Figure 5:
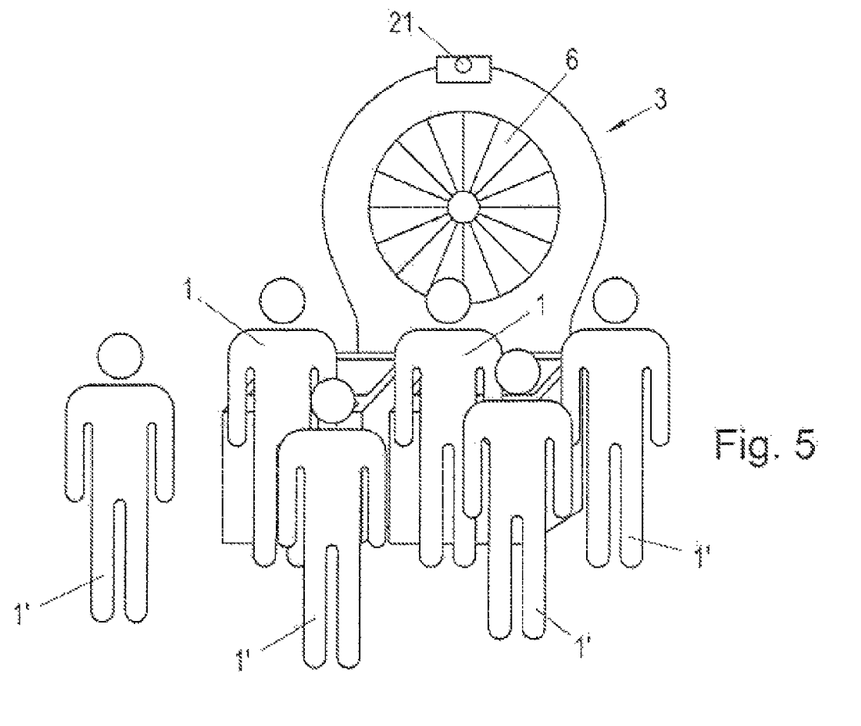
FIG. 5 shows the embodiment depicted in FIG. 4, with a number of spectators.

If a plurality of users 1 and spectators 1' are situated in the recording region of the camera 2 (FIG. 5), recording problems can be avoided in a special development of the invention by virtue of merely the center of mass 11 and the position of the hand 12 of those users 1 being determined who are identified as closest to the camera 2 within the recording region of the camera 2, i.e. the center of mass 11 and the position of the hand 12 of whom, in the present exemplary embodiment, have the smallest Z-coordinate value.

Alternatively, it is also possible to establish the hand and center of mass positions of all those users 1 who are situated within a certain region, in particular whose Z-coordinate values are situated below a predetermined distance threshold Zmax (FIG. 3).

Instead of the above-depicted procedure for determining the angular velocity ω during the turning phase B by the user 1, a further preferred embodiment of the invention shows a procedure which is independent of the center of mass 11 of the user 1 and referred to as a vector-based turning velocity identification in the following text. This preferred embodiment does not differ from the aforementioned first embodiment of the invention during the initial state A and during the free rotational phase C.

In this special embodiment of the invention, only the position of the hand 12, but not the position of the center of mass of the body 11, of the user 1 is detected continuously during the turning phase B in order to establish the turning movement. The position of the center of mass of the body 11 of the user 1 is merely established once, right at the start of the turning phase B, and need not be established again at a later stage. In particular, it is not necessary for the user 1 to turn the hand 12 about his center of mass of the body 11; rather, any circle-like hand movement can be used for turning the wheel of fortune 3. Like in the first exemplary embodiment of the invention, the position of the hand 12 of the user 1 is continuously established at predetermined times $t_n$.

In a first step, the positions of the center of mass of the body and of the hand are established once in the turning phase B. The X-coordinate values of the positions of the center of mass of the body 11 and of the hand 12 are compared such that it is possible to establish whether a rotation takes place with the right hand or with the left hand of the user 1.

After the side of the center of mass of the body 11 on which the hand 12 is situated has been established, an initial turning angle $\alpha_0 = \alpha_{start}$ is assigned thereto. In the following text, the assumption is made that the hand 12 is situated at the highest position thereof when exceeding the upper height threshold 13.

For the further calculation, the alternative method no longer requires the position of the center of mass of the body 11 of the user 1, but makes do with only the individual positions of the hand 12 recorded at consecutive times. Hand positions recorded in succession in each case are used for determining the turning angle α, wherein an attempt is made in this procedure to suppress movements of the hand 12 which are not relevant to the rotation, for example movements toward the wheel of fortune 3, i.e. in the Z-direction, or movements with a radial orientation relative to the wheel of fortune 3, i.e. in the direction toward or from the center of the wheel of fortune 3, and to use only those movements which occur in the circumferential direction of the wheel of fortune 3.

In the present exemplary embodiment, the assumption is made that the initial position of the right hand 12 is situated at an initial angle of $\alpha_{start} = 30°$. Here, the wheel of fortune 3 is oriented in such a way that an angle of 0° is present at the highest point of the wheel of fortune 3 and an angle of 180° is present at the lowest point of the wheel of fortune 3.

The user 1 carries out a circle-like hand movement, starting with a downward movement to the right, with the hand 12 successively assuming different positions hp_0, hp_1, . . . at different times. The coordinates of the individual positions of the hand 12 of the user 1 are in each case denoted by:

$$hp\_0 = [hp\_0\_X, hp\_0\_Y, hp\_0\_Z],$$

$$hp\_1 = [hp\_1\_X, hp\_1\_Y, hp\_1\_Z],$$

$$hp\_2 = [hp\_2\_X, hp\_2\_Y, hp\_2\_Z],$$

The hand positions hp_0 and hp_1 are in each case established at two times $t_0$ and $t_1$, recorded in succession. Then, the coordinates of the hand position hp_0 at the time $t_0$ and hp_1 at the time $t_1$ are available at the time $t_1$. Proceeding from these two values, the two variables β0 and d0 are determined according to the following formulae (FIG. 5):

$$\beta 0 = a\tan 2(hp\_0\_Y - hp\_1\_Y, hp\_1\_X - hp\_0\_X) = 95°,$$

$$d0 = \sqrt{(hp\_1\_X - hp\_0\_X)^2 + (hp\_1\_Y - hp\_0\_Y)^2}.$$

For a general time $t_n$, these values can be calculated as follows:

$$\beta n = a\tan 2(hp\_n\_Y - hp\_n+1\_Y, hp\_n+1\_X - hp\_n\_X)$$

$$dn = \sqrt{(hp\_n+1\_X - hp\_n\_X)^2 + (hp\_n+1\_Y - hp\_n\_Y)^2}$$

Figure 11:
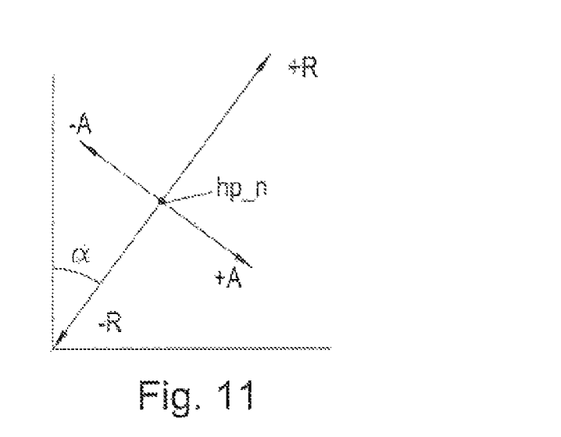

Here, the distance d0 corresponds to the distance between the hand positions at the times $t_0$ and $t_1$. FIG. 11 shows the hand position hp_0 at the initial angle of $\alpha\_0 = \alpha_{start} = 30°$. What is furthermore depicted is that a movement in the direction of the coordinate direction +A has a direct effect on the turning angle α of the wheel of fortune 3, while a movement against this coordinate direction, i.e. in the direction −A, correspondingly reduces the turning angle α. A movement in the radial direction, i.e. inward or outward in relation to the wheel of fortune 3 along the coordinate direction +R or −R, has no influence on the change in position of the wheel of fortune 3, just as little as a movement away from the wheel of fortune 3 or toward the latter.

Figure 12:
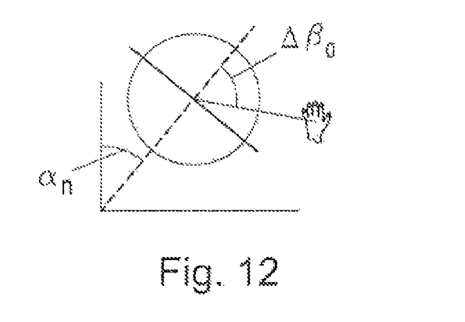

Changes in position which do not extend directly along one of the coordinate directions, but obliquely with respect thereto at an angle Δβ0, can be converted into angle lengths in accordance with the following prescriptions (FIG. 12):

$$\Delta\beta0 = \beta0 - \alpha\_0 = 65°$$

This angle Δβn is determined for all times t1, ..., tn and is generally set by $$\Delta\beta n = \beta n - \alpha\_n.$$

Figure 13:
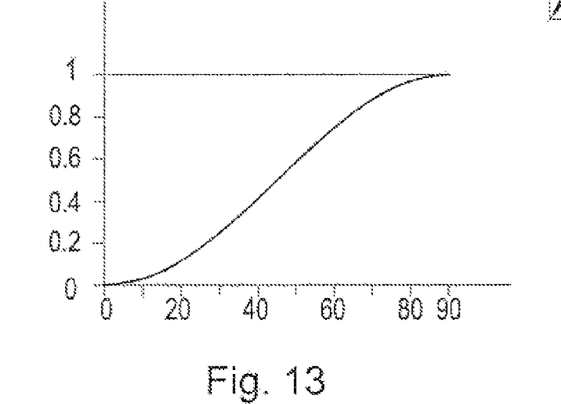

Movements of the hand position oblique to the respective coordinate directions R, A can now be taken into account in such a way that the change Δα of the turning angle α becomes ever more pronounced the more the movement of the hand position is in the direction of the coordinate direction A. With the aid of the interpolation function f depicted in FIG. 13, the change Δα of the turning angle α can be brought about as follows:

$$f\text{exp} = f(\Delta\beta n),$$

$$\Delta\alpha n = d0 * f\text{exp} * f\text{sensitivity}.$$

In the present special exemplary embodiment, the interpolation function f corresponds to the sine function. For turning the wheel of fortune in the counterclockwise direction, the interpolation function corresponds to: $f(\alpha) = \sin(\alpha)$. At the time t=0, there is a weighting with $f\text{exp} = f(\Delta\beta n) = \sin(65°) \sim 0.8$.

$$\Delta\alpha n = d0 * \sin(\Delta\beta n) * f\text{sensitivity}.$$

In the present exemplary embodiment, the sensitivity fsensitivity is specified to be 0.3, but can vary between 0 and 1, in particular between 0.1 and 0.4, depending on how strongly changes in the position of the hand position should affect the position of the wheel of fortune. After the change Δα of the turning angle α is set, a turning angle for the time tn+1 can be established on the basis of the turning angle α, present at the time tn, for the time tn.

$$\alpha n+1 = \alpha n + \Delta\alpha$$

Therefore, for the first time step after the start of the turning phase, the following results:

$$\Delta\alpha = 25 * 0.8 * 0.3 = 6°$$

$$\alpha1 = 30° + 6° = 36°$$

Figure 14:
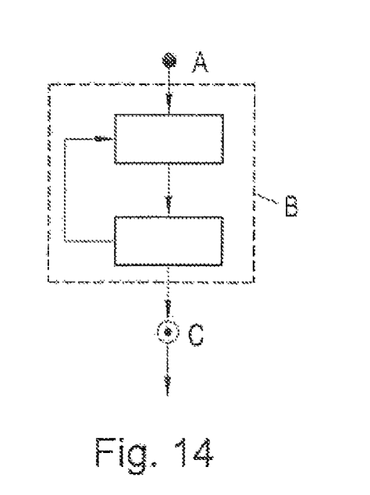
FIG. 14 shows, in detail, a particular embodiment of the procedure during the turning phase.

In order to avoid manipulations of the wheel of fortune 3, it is possible, in both depicted embodiments of the invention, to prescribe a minimum velocity for the wheel of fortune to enter the free rotational phase (FIG. 14). To the extent that the velocity is too small, there can be a return to the initial phase A and lifting of the hand 12 is awaited again.

As depicted in the preceding exemplary embodiment, the turning phase B can be completed when there is a drop below a lower height threshold 14. However, alternatively, it is also possible for the turning phase B to be completed when the change in the turning angle α exceeds a predetermined threshold value.

In an even further alternative, it is possible for the turning phase B to be completed when a certain change in angle has been performed, i.e. the turning phase B is completed at a time t_n, at which α_n−α_0 exceeds a certain threshold value.

If the position of the hand 12 of the user 1 can no longer be determined or established during the turning phase B, the initial phase A is once again returned to and the position of the hand 12 is searched for.

In an even further alternative, or additionally, provision is made, for identifying the end of the turning phase B, for the turning phase B to be completed when a predetermined time threshold value $t_{SW}$, for example measured from the time of exceeding the upper height threshold 14, is reached or exceeded.

The presently described embodiment describes a turning process which describes turning of the wheel of fortune 3 in the downward direction. Therefore, an upper height threshold 13 is also predetermined, the exceeding of which initiates the turning phase B. Alternatively, there can be turning in a horizontal plane or from the bottom to the top. In this case, a threshold is set in each case in relation to the respective turning movement. In this case, the height threshold is to be understood to mean a region delimitation, the hand 12 triggering the respective turning phase B when it leaves said region delimitation.

Figure 15:
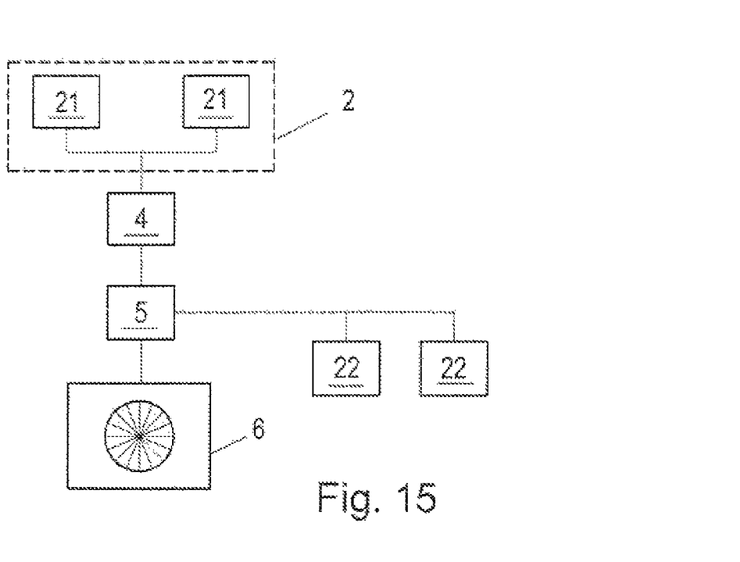
FIG. 15 schematically shows the data transmission in the arrangement according to the invention.

FIG. 15 schematically depicts an arrangement comprising a camera 2 with two sensors 21. The signals generated by the two sensors 21 are transmitted to an identification unit 4 which, upon activation, establishes the position of the hand (12) and of the center of mass of the body 11 of a user 1 situated in the recording region of the camera 2. This activation is brought about by a control unit 5 connected to the identification unit 4. The control unit 5 is connected to the individual gambling machines 22 and, furthermore, actuates the display unit 6 which depicts the wheel of fortune 3. Provided that an in-game game, which contains turning of the wheel of fortune 3 as constituent, is intended to be started, an activation signal is transmitted from the respective gambling machine 22 to the control unit 5. The gambling machines 22 and the control unit 5 are arranged on the same bus or in the same network.

Upon activation, the control unit 5 is put into an initial state, in which the control unit 5 actuates and activates the acquisition unit 4 for establishing the position of the center of mass of the body 11 and for continuously establishing the position of the hand 12 of the user 1. In this preferred embodiment, the control unit 5 comprises a comparison unit for comparing the established position of the hand 12 with a predetermined height threshold 13. When this height threshold 13 is exceeded or passed by the position of the hand 12, the initial state is ended and the turning phase B is started.

Advantageously, the aforementioned processes and method steps in the camera 2, in the identification unit 4 and in the control unit 5 are carried out by a microcomputer. In particular, the data transmitted by the camera 2 are acquired and processed further by the identification unit 4 in a timer-controlled manner or by means of an interrupt control.

The invention claimed is:

1. A method for operating a wheel of fortune by a user, wherein a camera is used to establish the position of the center of mass of the body and of a hand of the user,
   setting an upper height threshold to a predetermined value in relation to the center of mass of the body, wherein, when the position of the hand exceeds the upper height threshold, a turning phase is started, during which turning phase the position of the wheel of fortune is coupled to the position of the hand and the position of the hand is established continuously, continuously determining the movement performed by the movement of the hand of the user and establishing a turning angle (α), continuously determining an angular velocity (ω), which is the rate of change of the established angle (α) over time, completing the turning phase depending on a threshold value and determining the angular velocity (ω) as an initial turning velocity ($ω_e$) preferably directly before the end of the turning phase, starting a free rotational phase after the end of the turning phase, wherein the further turning of the wheel of fortune is performed with the initial turning velocity ($ω_e$) as initial velocity and the wheel of fortune is continuously decelerated and comes to rest at a certain end position and this end position is kept available, setting a further height threshold to a predetermined value below the center of mass of the body, and when the turning phase is completed, starting the free rotational phase when the position of the hand drops below the further height threshold.

2. The method as claimed in claim 1, wherein the turning phase is completed and the free rotational phase is started when the angle covered by the wheel of fortune with respect to the initial position during the turning phase exceeds a predetermined threshold value and/or when the angular velocity (ω) exceeds a predetermined threshold value.

3. The method as claimed in claim 1, wherein the turning angle (α) is established periodically in time as an angle between a straight line, extending through the center of mass of the body and the position of the hand, and a predetermined, in particular perpendicular, reference straight line.

4. The method as claimed in claim 1, wherein, at the start of the turning phase, the turning angle (α) is set to a start angle αstart=α_0 and, during the turning phase, the position (hp_n) of the hand of the user is established continuously at predetermined times tn $$hp_n=[hp\_n\_X, hp\_n\_Y, hp\_n\_Z],$$

and in that the following calculations are performed at each time (tn) during the turning phase:

$$βn=a\tan 2(hp\_n\_Y-hp\_n+1\_Y, hp\_n+1\_X-hp\_n\_X)$$

$$dn=\sqrt{((hp\_n+1\_X-hp\_n\_X)^2+(hp\_n+1\_Y-hp\_n\_Y)^2)}$$

$$Δβn=βn-α\_n$$

$$fexp\_n=f(Δβn)$$

$$Δαn=d0*fexp\_n*fsensitivity$$

$$αn=αn-1+Δαn$$

where αn is the turning angle of the wheel of fortune at the time tn and where, preferably, f is the sine function and where fsensitivity has a value between 0 and 1, in particular between 0.1 and 0.4.

5. The method as claimed in claim 1, wherein the position of the hand at the time of exceeding the height threshold are compared to the position of the center of mass of the user in relation to a coordinate direction extending horizontally and normally to the plane of the wheel of fortune and a rotation of the wheel of fortune in the clockwise direction or in the counterclockwise direction is assumed depending on this comparison.

6. The method as claimed in claim 1, wherein the wheel of fortune is depicted at its respective turning angle (α) on a monitor during the turning phase and/or during the free rotational phase and this representation is updated at predetermined intervals such that a turning movement of the wheel of fortune is perceived on the monitor.

7. The method as claimed in claim 1, wherein the position of the center of mass of the body and of the hand of the user is established by means of a 3D camera or an infrared-based depth-sensor camera, wherein distance information to the camera is respectively established for a number of pixels of the respective camera.

8. The method as claimed in claim 1, wherein, of those users situated in the recording region of the camera, it is only the user closest to the camera who is used for establishing the turning movement of the wheel of fortune.

9. A wheel of fortune apparatus comprising:

a display unit with a monitor for depicting a wheel of fortune, an acquisition unit with a camera for detecting and recording a user turning the wheel of fortune, and a control unit connected to the acquisition unit and to the display unit, wherein the control unit is configured to establish the position of the hand and of the center of mass of the body of a user situated in the recording region of the camera, wherein the control unit is programed to depict the wheel of fortune on the display unit at predetermined times with a predetermined turn angle (α), wherein the control unit is programed to be put into an initial state upon activation, in which the control unit actuates the acquisition unit for establishing the positions of the center of mass of the body and for continuously establishing the position of the hand of the user, wherein, the control unit is programed so that, an upper height threshold can be set to a predetermined value in relation to the center of mass of the body and a comparison of the established position of the hand with the upper height threshold can be undertaken and, when the position of the hand exceeds the upper height threshold, the initial state is completed and a turning phase starts, wherein the control unit is programed to continuously establish the position of the hand during the turning phase and continuously establishes the turning angle (α) performed by the movement of the hand of the user and couples the turning of the wheel of fortune to the movement of the hand, wherein it furthermore continuously determines the angular velocity (ω), which is the rate of change of the established angle (α) over time, wherein the control unit is programed to end the turning phase depending on a threshold value and establishes the angular velocity (ω) established directly before the end of the turning phase as initial turning velocity ($ω_e$), wherein the control unit is programed to, after the end of the turning phase, starts a free rotational phase, during which the further turning of the wheel of fortune can be undertaken with the initial turning velocity ($ω_e$) established thus and the wheel of fortune is continuously decelerated and comes to rest at a certain end position and this end position can be kept available by the control unit, and wherein the control unit is programed to establish further height threshold set to a predetermined value below the center of mass of the body, and the control unit ends the turning phase and starts the free rotational phase when the hand drops below the further height threshold.

10. The wheel of fortune apparatus as claimed in claim 9, wherein the control unit is programed to end the turning phase and start the free rotational phase when the turning angle ($\alpha$) covered by the wheel of fortune with respect to the initial position during the turning phase exceeds a predetermined threshold value and/or when the angular velocity ($\omega$) exceeds a predetermined threshold value.

11. The wheel of fortune apparatus as claimed in claim 9, wherein the control unit comprises a turning angle determination unit, which is programed to establish the turning angle ($\alpha$) periodically in time as an angle between a straight line, extending through the center of mass of the body and the position of the hand, and a predetermined, in particular perpendicular, reference straight line.

12. The wheel of fortune apparatus as claimed in claim 9, wherein the control unit comprises a turning angle determination unit, which is programed to:
set the turning angle ($\alpha$) to a predetermined start angle $\alpha\text{start} = \alpha\_0$ at the start of the turning phase,
establish, during the turning phase, the position (hp_n) of the hand of the user continuously at predetermined times tn $$hp\_n = [hp\_n\_X, hp\_n\_Y, hp\_n\_Z], \text{ and}$$

perform the following calculations at each time tn during the turning phase:

$$\beta n = a\tan 2(hp\_n\_Y - hp\_n+1\_Y, hp\_n+1\_X - hp\_n\_X)$$

$$dn = \sqrt{((hp\_n+1\_X - hp\_n\_X)^2)}$$

$$\Delta\beta n = \beta n - \alpha\_n$$

$$f\exp\_n = f(\Delta\beta n)$$

$$\Delta\alpha n = d0 * f\exp\_n * f\text{sensitivity}$$

$$\alpha n = \alpha n - 1 + \Delta\alpha n$$

where $\alpha n$ is the turning angle ($\alpha$) of the wheel of fortune at the time (tn) and where, preferably, f is the sine function and where fsensitivity has a value between 0 and 1, in particular between 0.1 and 0.4.

13. The wheel of fortune apparatus as claimed in claim 9, wherein the control unit further comprises a comparison unit, which is programed to compare the position of the hand at the time of exceeding the height threshold to the position of the center of mass of the user in relation to a coordinate direction extending normally to the plane of the wheel of fortune and horizontally, and establish whether a rotation of the wheel of fortune in the clockwise direction or in the counterclockwise direction takes place depending on this comparison.

14. The wheel of fortune apparatus as claimed in claim 9, wherein the control unit is programed to cause the display unit to depict the wheel of fortune at its respective turning angle ($\alpha$) on the monitor during the turning phase and/or during the free rotational phase and update this representation at predetermined intervals such that a turning movement of the wheel of fortune can be perceived on the monitor.

15. The wheel of fortune apparatus as claimed in claim 9, wherein the camera is a 3D camera or an infrared-based depth-sensor camera, and the control unit is programed to establish distance information to the camera based on a number of pixels.

16. The wheel of fortune apparatus as claimed in claim 9, wherein the control unit further comprises a selection unit, which, of those users situated in the recording region of the camera, selects only the user closest to the camera for establishing the turning movement of the wheel of fortune.

* * * * *

UNITED STATES PATENT AND TRADEMARK OFFICE
CERTIFICATE OF CORRECTION

PATENT NO. : 9,595,156 B2
APPLICATION NO. : 14/373675
DATED : March 14, 2017
INVENTOR(S) : Harald Kaiblinger et al.

It is certified that error appears in the above-identified patent and that said Letters Patent is hereby corrected as shown below:

In the Claims

Column 13, Lines 37-38, Claim 4:
After "predetermined times tn"
Delete the formula "hp_ = [hp_n_X, hp_n_Y, hp_n_Z],"
And insert: -- hp_n = [hp_n_X, hp_n_Y, hp_n_Z], --.

Column 15, Line 26, Claim 12:
Delete "hp_n = [hp_n_$x$, hp_n_$y$, hp_n_$z$],"
And insert: -- hp_n = [hp_n_X, hp_n_Y, hp_n_Z], --.

Column 15, Line 31, Claim 12:
After "βn = atan2(hp_n_Y – hp_n+1_Y, hp_n+1_X - hp_n_X)"
Delete "dn = √((hp_n+1_X - hp_n_X)$^2$"
And insert: -- dn = √((hp_n+1_X - hp_n_X)$^2$ + (hp_n+1_Y - hp_n_Y)$^2$ --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*